Figure 1:
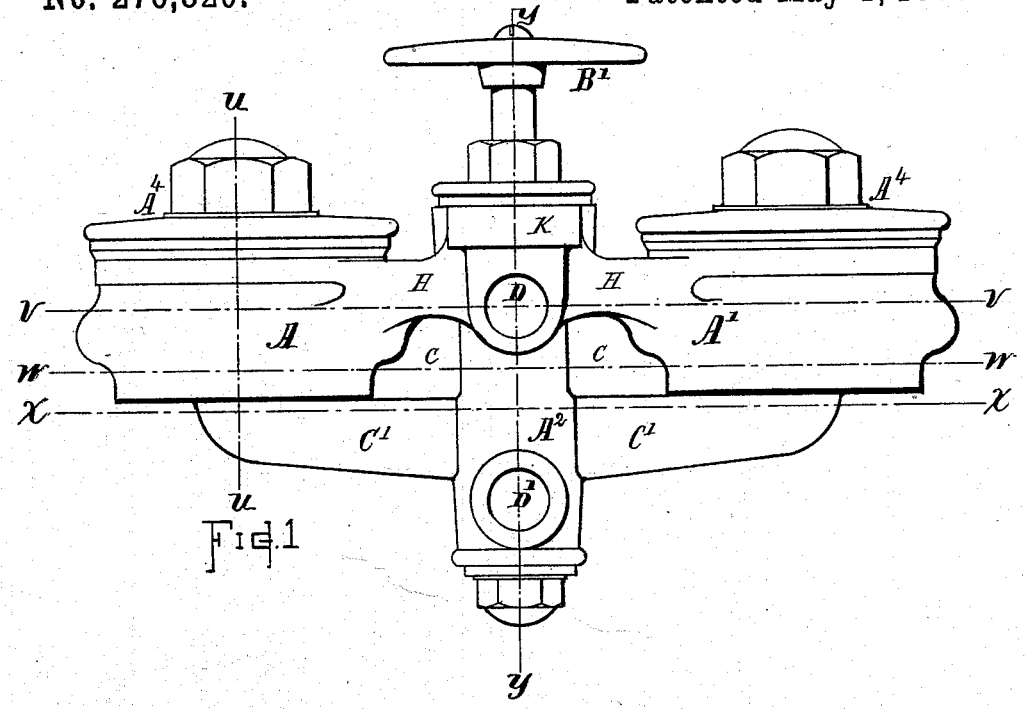

(No Model.) 5 Sheets—Sheet 1.

J. HOWES.
FILTER.

No. 276,820. Patented May 1, 1883.

WITNESSES
INVENTOR
John Howes
By Chas. H. Burleigh
Atty.

(No Model.) 5 Sheets—Sheet 2.

J. HOWES.
FILTER.

No. 276,820. Patented May 1, 1883.

Witnesses
J. R. Barton
W. B. Allen

Inventor
John Howes
By Chas. H. Burleigh
Atty.

(No Model.) 5 Sheets—Sheet 3.

J. HOWES.
FILTER.

No. 276,820. Patented May 1, 1883.

Witnesses

Inventor
John Howes
By Chas. H. Burleigh
Atty.

(No Model.)  
J. HOWES.  
FILTER.  
No. 276,820. Patented May 1, 1883.
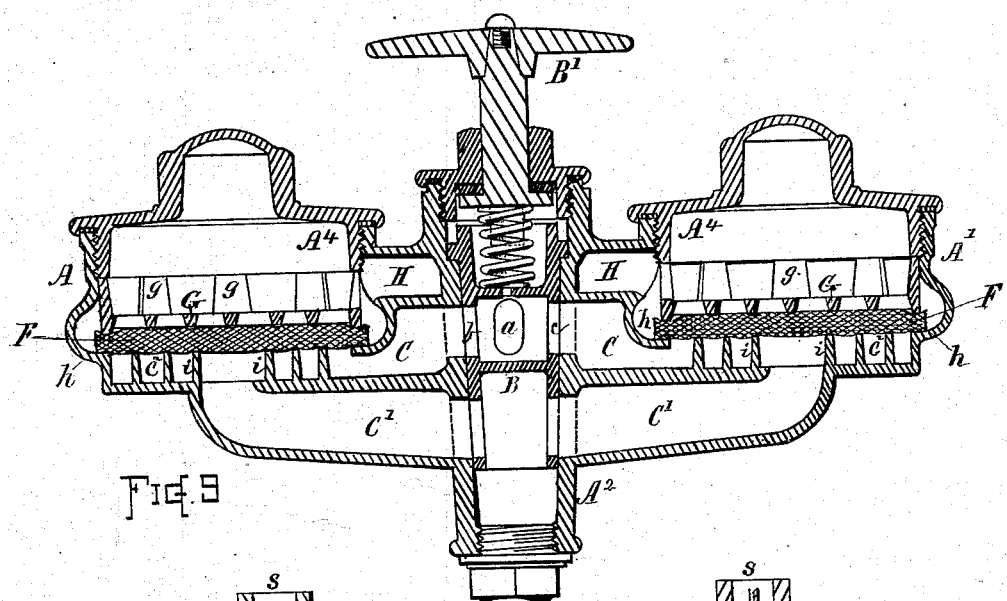
Fig. 9
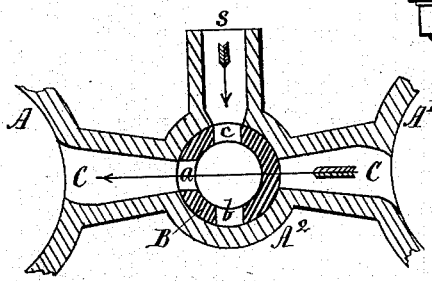 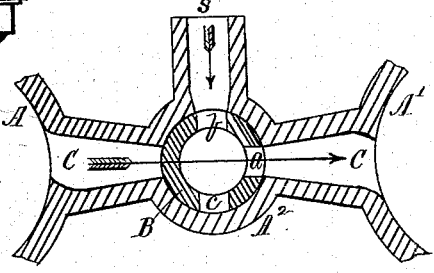
Fig. 10  Fig. 12
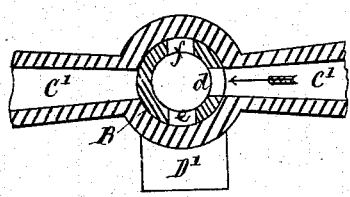 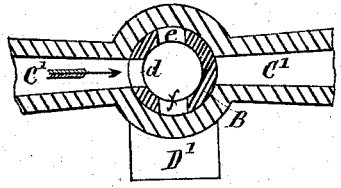
Fig. 11  Fig. 13
WITNESSES  
J. R. Barton  
W. B. Allen  
INVENTOR  
John Howes  
By Chas. H. Burleigh  
Atty.

(No Model.)

J. HOWES.
FILTER.

No. 276,820. Patented May 1, 1883.

WITNESSES.
J. R. Barton
W. B. Allen

INVENTOR.
John Howes
By Chas. H. Burleigh
Atty.

UNITED STATES PATENT OFFICE.

JOHN HOWES, OF WORCESTER, MASSACHUSETTS.

FILTER.

SPECIFICATION forming part of Letters Patent No. 276,820, dated May 1, 1883.

Application filed June 17, 1882. (No model.)

*To all whom it may concern:*

Be it known that I, JOHN HOWES, of Worcester, in the county of Worcester and State of Massachusetts, have invented certain new and useful Improvements in Filters; and I declare the following to be a description of my said invention sufficiently full, clear, and exact to enable others skilled in the art to which it appertains to make and use the same, reference being had to the accompanying drawings, which form a part of this specification.

My present invention relates to certain improvements in that class of liquid-filters described in my previous Letters Patent, No. 236,496, dated January 11, A. D. 1881, the object being to provide facilities for the automatic and efficient cleansing of the filter-plates or strainers while in use by means of the circulation of water along the surface of said filter-plates when drawing water in the ordinary service of the filter, and by confining the currents within narrow channels to give increased force of water flowing in contact with a given area of the filter-surface; to provide in compact form a large area of filtering-plate surface proportionally to the area of supply-pipe passage, and to so arrange the parts as to afford a slow passage of water while depositing the sediment or impurities upon the filter-plates, and a rapid, powerful current for cleansing or removing the sediment therefrom. I attain these objects by an apparatus constructed and organized for operation as illustrated in the drawings and herein described, the particular features claimed being hereinafter definitely specified.

Figure 2:
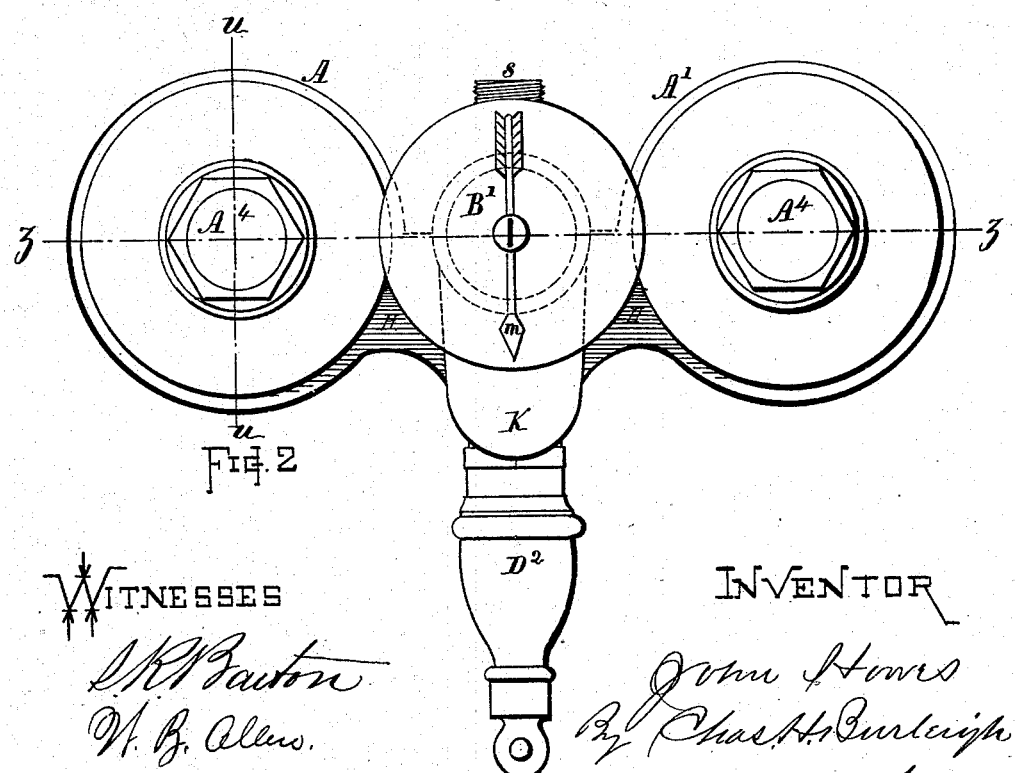
Figure 3:
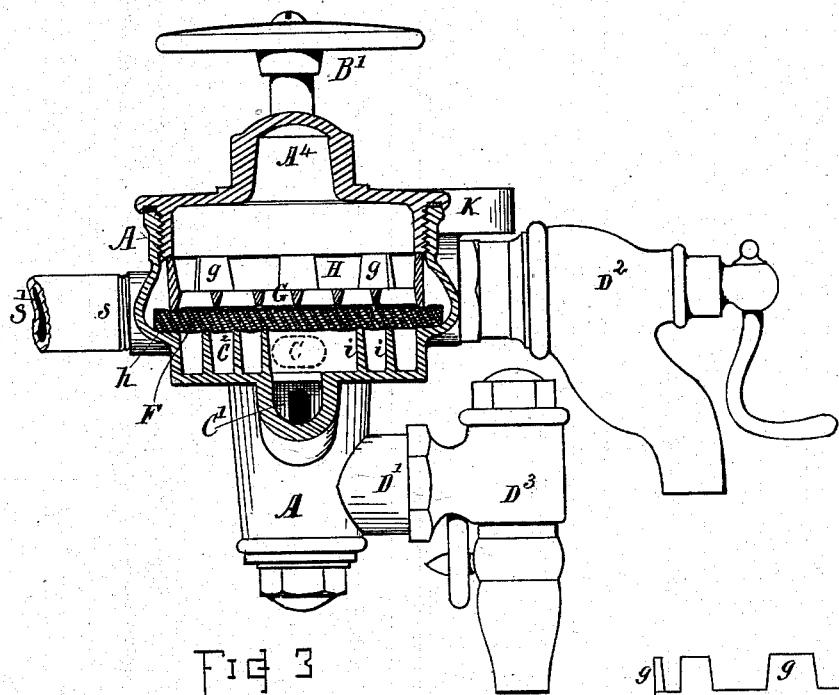
Figure 5:
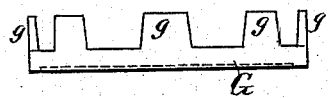
Figure 4:
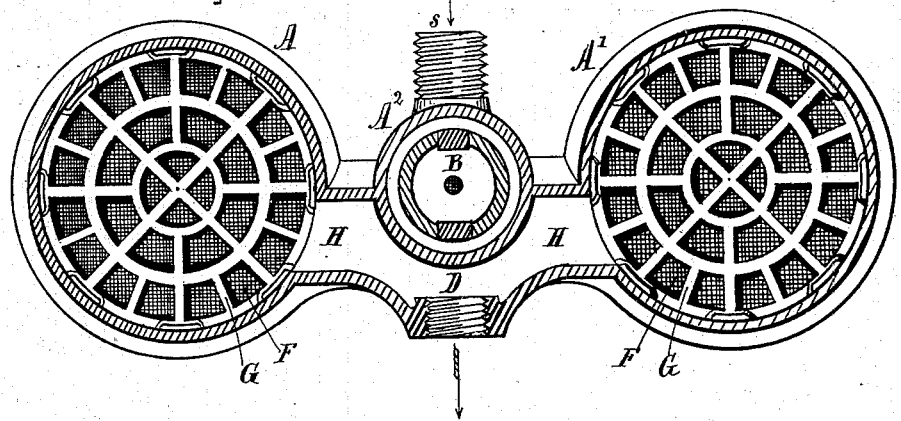
Figure 6:
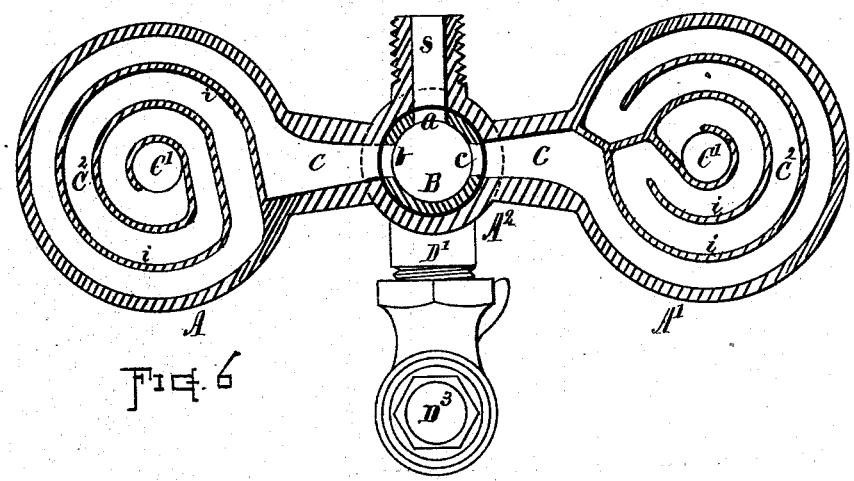
Figure 7:
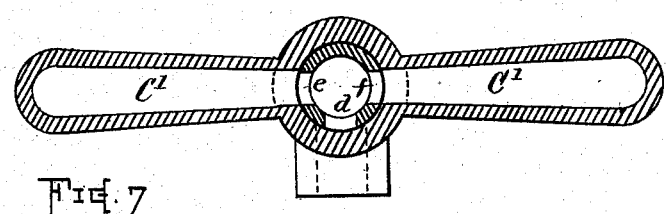
Figure 8:
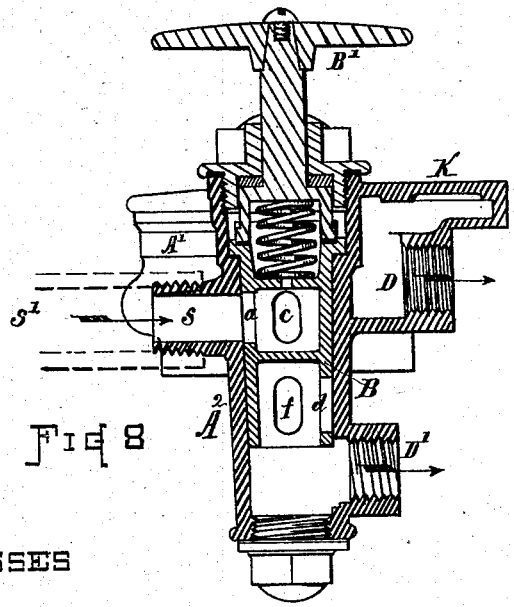
Figure 14:
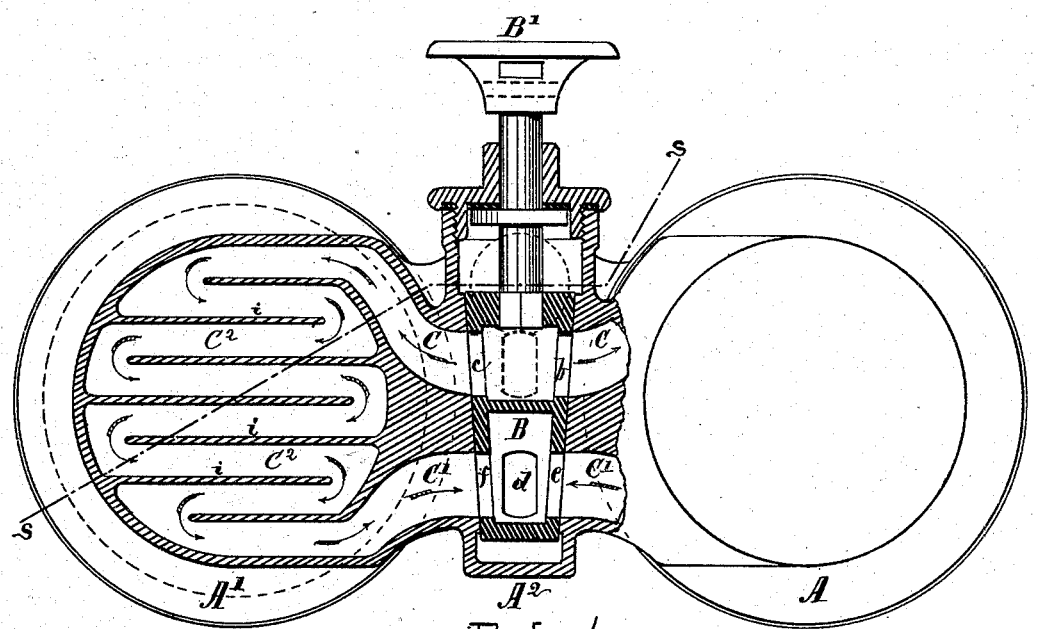
Figure 15:
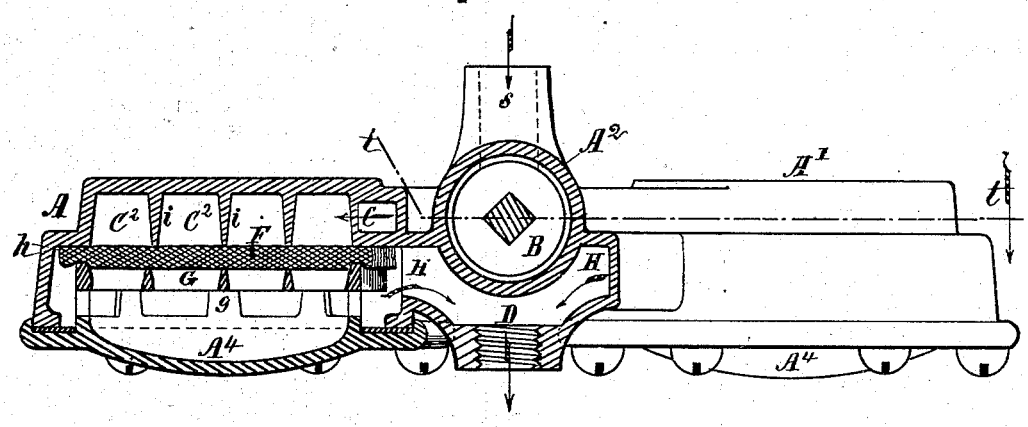

Figure 1 is a front view of my improved filter. Fig. 2 is a plan view of the same with faucets connected thereto. Fig. 3 is a vertical section through one of the filter-chambers at line $u\ u$, Figs. 1 and 2, also showing side view of the faucets and pipe-connections. Fig. 4 is a horizontal section of the filtering apparatus at the position of line $v\ v$, showing the top of the grates and filter-plates and the channel for the delivery of filtered water or liquid. Fig. 5 is a side view of one of the grates used for holding down the filter plates or felts. Fig. 6 is a horizontal section at the position of line $w\ w$, Fig. 1, showing the channels beneath the filter-plates, through which the supply-water enters and circulates. Fig. 7 is a horizontal section at the position of line $x\ x$, Fig. 1, showing the interior of the channel for discharge of unfiltered water and sediment. Fig. 8 is a vertical section through the central cock or valve devices, showing the supply and delivery passages at the position indicated by line $y\ y$ on Fig. 1. Fig. 9 is a central vertical section through both the filters and central cock at the position of line $z\ z$, Fig. 2, showing the relative location and arrangement of the filter plates and passages. Fig. 10 is a horizontal section through the upper chamber of the directing-cock, and Fig. 11 is a horizontal section through the lower chamber thereof when adjusted to position for causing the water or liquid to flow directly through the left-hand filter and reversely through the right-hand filter. Figs. 12 and 13 are similar sectional views, showing the cock as adjusted for passing the water directly through the right-hand filter and reversely through the left-hand filter, or in opposite direction to the above. Fig. 14 is a part rear, part sectional view at line $t\ t$, showing a modification in construction, wherein the filter cases or chambers are arranged so that the planes of the filter-plates stand in vertical position instead of horizontal position, or parallel with the axis of the directing-cock. The arrows indicate the direction of flow of water through the channels, as when washing off the filter-plates. Fig. 15 is a part plan, part sectional view at line $s\ s$, Fig. 14, showing similar construction and arrangement of parts, with arrows indicating the direction of the flow when filtering water.

In referring to the drawings, A and A' denote the two filter chambers or cases, respectively arranged at the right and left of the valve-seat chamber or cylindrical body $A^2$, within which is located the directing-cock or plug-valve B, for governing the flow of water through the apparatus as desired. The cylinder $A^2$ is provided with inlet and outlet passages surrounded by suitable bosses for securing pipes and faucets thereto. Of these passages, S indicates the supply through which the water enters, D indicates the delivery for filtered water, and D' the delivery for unfiltered water and sediment. The interior of the cylinder $A^2$ is properly bored out to form a valve-seat for the plug or valve B, which is made substantially in the form shown, with upper and lower chambers separated by a solid diaphragm formed across the center of the plug, and with a suitably-packed stem provided with a cap wheel or handle, B', by means of which the valve or cock can be operated. An index or pointer, m, can be arranged on the handle, to show the direction of flow and to serve as a guide in the adjustment of the cock. The chambers of the valve-plug B have three ports or openings in each. The ports a, b, and c open to the upper chamber of the valve, and work in connection with the supply S and channels C, leading to the under surfaces of the filter-plates, while the ports d, e, and f open to the lower chamber of the valve, and work in connection with the sediment-channels C' and the delivery D' for unfiltered water.

The filter-cases A and A' have central enlargements or suitable annular ledges, h, for supporting the filtering material, and are provided with removable caps A⁴, for permitting ready access to the interior of the chambers. The bottom of the chambers, below the level of the ledges h, is divided by a thin partition or partitions, i, into a narrow winding channel, C², of spiral, serpentine, or other suitable form, whereby the space, without being materially diminished, is included in a channel instead of a basin. The ends of said channel C² are respectively continuous with channels or passages C, leading to the upper chamber of the valve-plug, and with channels C', leading to the lower diameter of the valve-plug. The latter channels, C', have a downward inclination, and are arranged for draining the filter-chambers through the delivery-opening D'. The partitions i can be arranged as indicated at the right or left in Fig. 6, or as shown in Fig. 14, or in any other equivalent manner, for circulating the liquid in a narrow, strong current along the surface of the filtering material.

F indicates the plates or disks of filtering material. These filter-plates are preferably composed of suitably fine felt, one or more disks being used, as desired. The edges of the disks rest upon the ledges h, and their central portion is supported upon the top of partitions i. They are retained in place by means of a grating, G, placed upon the top of the felt, and held down by the cap A⁴ when the latter is screwed on for closing the top opening of the case. The rim of the grating G is made thicker than its cross-bars, and projects slightly at the lower side, so as to clamp the disk or plate F firmly against the ledges h, for holding the disk along the periphery without compressing the central portion thereof more than is necessary to keep it in position flat upon the tops of the partitions i. The grate G is provided with occasional lugs g about its rim to receive the pressure of the cap-flange, while permitting space for the free flow of water to or from the filter-plates. If preferred, these lugs can be formed on the cap-flange.

H indicates a clear-water channel or passage connecting the upper chambers, and communicating with the delivery D for filtered water only. This passage has no communication with the supply water-passages except through the filtering-plates. At the front is a projection or boss, K, to which a pump or a stand-pipe may be connected, if desired. The projection or boss K is placed on the shell for the convenience of service where it is desired to supply filtered water to chambers, or to a tank in the upper part of the house, while the filter is placed for use at the kitchen-sink or elsewhere in the basement. This boss can at any time be bored and tapped for connecting a pipe to supply the tank or chambers without disturbing the delivery-faucets or interfering with their arrangement and operation.

A supply-pipe, S', is connected with the passage S, and faucets D² and D³ are connected with the delivery-passages when it is desired to draw water directly from the filter; or, if the filter is employed in a line of service-pipes, the pipes may be connected in place of the faucets, those from the upper passage, D, being carried to the wash-basins, drinking-fountains, and sinks, where filtered water is required, and those from the passage D' being carried to the slop-sinks and water-closets, or places where unfiltered water will suffice, so that by the ordinary flow of unfiltered water for household uses the filter will be kept free from sediment, and the plates F be cleansed or washed off automatically and without any special attention being given to the filter.

The arrangement and proportion of parts shown herein gives a large area of filtering-surface proportionally as compared with the area of pipe-passage, so that while the movement of the water percolating through the filter-plates F is quite slow the given quantity is easily passed by the excess of area; hence the deposited sediment is laid but lightly onto the bottom surface of the filter-plates, and can be readily washed away by the current of water passing along the surface of said plates when the lower delivery-passage, D', is opened. The flow of the water being confined by the partitions i within a narrow channel along the bottom surface of the filtering-plates, a very strong, swift current is brought into action for washing the sediment from the plates F. The action by reversing the flow either to the right or the left direction through the apparatus is similar to that described in my Letters Patent No. 236,496, except that the operation is rendered more effective and positive by the use of the additional passages C' and the confinement of the flow to the narrow channel C²—that is to say, in the present filter I attain the additional benefit of a direct and positive washing-current by way of the passages C, C², and C' underneath the filter-plates.

The operations under the several adjustments of the directing-cock B may be briefly noted as follows:

First. When the cock is adjusted with the index pointing to the front, (see Figs. 6, 7, 8, and 9,) the port $a$ is then in connection with the supply S, both filters are in operation for direct upward flow of water through the plates F, and the delivery of the maximum quantity of filtered water through passage D is attained. This is the usual working position.

Second. The cock B being turned so that the index points to the left, (see positions of ports as shown on Figs. 10 and 11,) and passage D' being opened, the water then flows upward through the left-hand filter and downward through the right-hand filter.

Third. The cock being adjusted with the index pointing to the right, (see positions of ports as shown in Figs. 12 and 13,) and passage D' being opened, the water then flows upward through the right-hand filter and downward or reversely through the left-hand filter.

Fourth. The cock B being adjusted to point toward the rear, passage S is closed and the supply shut off. The caps $A^4$ can then be removed and the filter-plates taken out and replaced, if necessary, and the interior of the chambers examined as desired.

It will be understood that in ordinary use, when drawing water, the cock B is not disturbed, as the faucets $D^2$ and $D^3$ serve for the drawing of the water filtered or unfiltered, as desired, the upper faucet, $D^2$, being capable of delivering only filtered water and the lower faucet only unfiltered water.

By the use of the partitions $i$ the filtering plates or felt F is sufficiently supported without the necessity of other grating or netting, and the flow of water, when washing off the plates, is brought into direct and forcible contact with the surface of the felt, thus rendering the cleansing action very effective. When a reverse flow is established, the filtered water passing downward through the felt serves to loosen lodged particles of sediment, and such particles are immediately carried away through the channel C' by the current in the channel $C^2$.

When it is desired to use other substances than felt as a filtering material, the height of the filter chambers or cases A A' may be increased as required for receiving the necessary quantity or thickness of material composing the plates between the level of the ledges $h$ and partitions $i$ and the under side of the grating G.

Having on even date herewith made application for separate Letters Patent for improvements in filters, it will be understood that my present invention embraces features of improvement appertaining to filters of disk form, and that I do not include herein features as appertaining to filters of cylindrical or conical form, or such as are claimed in my said separate application.

What I claim as of my invention, and desire to secure by Letters Patent, is—

1. A filter provided with means for the positive circulation of a current of water or liquid in direct contact with the filtering material, and confined within a narrow channel along the surface of the filter-plate, for the purpose set forth.

2. In a filtering apparatus, the combination, with the body or filter-case, of a partition or partitions rising from the bottom of said case, and adapted to form a grate or support for the disks of felt or filtering material, and to serve as a guide for conducting the water or liquid in a narrow spiral or serpentine course or channel along the surface of the felt or filtering material, substantially as set forth.

3. A filtering apparatus constructed, substantially as described, with two compartments or filter-cases, a central directing cock or valve having two separate chambers, with ports respectively communicating with the inlet and outlet passages, and with circulating-channels within said filter-cases, leading from one chamber of said cock to the other, and adapted for confining and conveying water or liquid in positive flowing contact along the under surface or dirt-receiving side of the filter-plates in a narrow winding course, as set forth.

4. The combination, with the body or frame provided with right and left filter-chambers, A A', and central valve-cylinder, $A^2$, having the inlet-passage S, and upper and lower delivery-passages, D and D', of the valve-plug B, having an upper chamber with three ports, $a\ b\ c$, and a lower chamber with three ports, $d\ e\ f$, relatively arranged as shown, the filtering-plates F, located and supported within said filter-chambers, the supply-passage C, the circulating-channels $C^2$, and sediment-channels C', located below or behind said filter-plates, and the filtrate-passage H above or in front of said plates, substantially as shown, and for the purpose herein described.

5. The combination of the filter-cases A A', provided with annular side channels, ledges $h$, and partitions $i$, the felt disks or filter-plates F, supported thereon, the grating G, having rim flanges or lugs $g$, with intervening passages for fluid, and the cap $A^4$, having an inward flange for engaging with lugs $g$, said parts being constructed and arranged substantially as shown, and for the purposes set forth.

6. The filter-body having the two filter-cases A A' and filtrate-delivery D, and provided with a boss or extension, K, in connection with said filtrate-delivery, for the attachment of a pump or reservoir.

Witness my hand this 12th day of June, A. D. 1882.

JOHN HOWES.

Witnesses:
CHAS. H. BURLEIGH,
AUSTIN U. MATHEWS.